(12) United States Patent
Zacharias et al.

(10) Patent No.: US 8,391,038 B2
(45) Date of Patent: Mar. 5, 2013

(54) INVERTER FOR FEEDING ELECTRIC ENERGY INTO A POWER SUPPLY SYSTEM

(75) Inventors: Peter Zacharias, Kassel (DE);
Benjamin Sahan, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 574 days.

(21) Appl. No.: 12/309,748

(22) PCT Filed: Apr. 12, 2008

(86) PCT No.: PCT/DE2008/000621
§ 371 (c)(1),
(2), (4) Date: Nov. 12, 2009

(87) PCT Pub. No.: WO2009/003432
PCT Pub. Date: Jan. 8, 2009

(65) Prior Publication Data
US 2010/0135054 A1 Jun. 3, 2010

(30) Foreign Application Priority Data
Jun. 29, 2007 (DE) .......................... 10 2007 030 577

(51) Int. Cl.
*H02M 7/5387* (2007.01)
(52) U.S. Cl. ....................................... 363/132; 363/136
(58) Field of Classification Search .................. 363/132, 363/136
See application file for complete search history.

(56) References Cited

U.S. PATENT DOCUMENTS

| | | | |
|---|---|---|---|
| 5,835,371 A * | 11/1998 | Kume et al. | 363/132 |
| 8,027,179 B2 | 9/2011 | Hallak | |
| 2007/0047277 A1 | 3/2007 | Konishi et al. | |
| 2008/0212348 A1 | 9/2008 | Hallak | |
| 2010/0135054 A1 * | 6/2010 | Zacharias | 363/132 |
| 2012/0155141 A1 * | 6/2012 | Esaka et al. | 363/132 |

FOREIGN PATENT DOCUMENTS

| | | |
|---|---|---|
| DE | 19642522 | 4/1998 |
| DE | 19732218 | 3/1999 |
| DE | 10221592 | 12/2003 |
| DE | 10225020 | 12/2003 |
| DE | 102004030912 | 1/2006 |
| DE | 102004037446 | 6/2006 |
| DE | 102005024465 A1 | 11/2006 |
| JP | 2002199736 A | 7/2002 |
| JP | 2006136052 A | 5/2006 |
| WO | 2006/005562 | 1/2006 |

* cited by examiner

*Primary Examiner* — Jeffrey Sterrett
(74) *Attorney, Agent, or Firm* — Eschweiler & Associates, LLC

(57) ABSTRACT

An inverter (3) is described for feeding electrical energy into a power supply system (2) having in each case one input (6, 7) which is intended for connection to the negative and positive output (4, 5) respectively of a DC voltage generator (1) two outputs (8, 9) which are intended for connection to the power supply system (2), and a device, which has a strong inductor (L1) and switches (S1 to S6), for conversion of a DC voltage to an AC voltage. The input (7) which can be connected to the negative output (5) of the DC voltage generator (1) can be grounded, and at least one of the two outputs (8, 9) is provided with a mains inductor (L2). According the invention, the device contains a bridge circuit with two current paths (S4, L1, S6; S5, L1, S3) of which the one provides positive and the other negative output currents, a switching unit for switching, which is carried out at the power supply frequency, between the two current paths (S4, L1, S6; S5, L1, S3) and a coupling capacitor (1) which connects the bridge circuit to the switching unit.

20 Claims, 4 Drawing Sheets

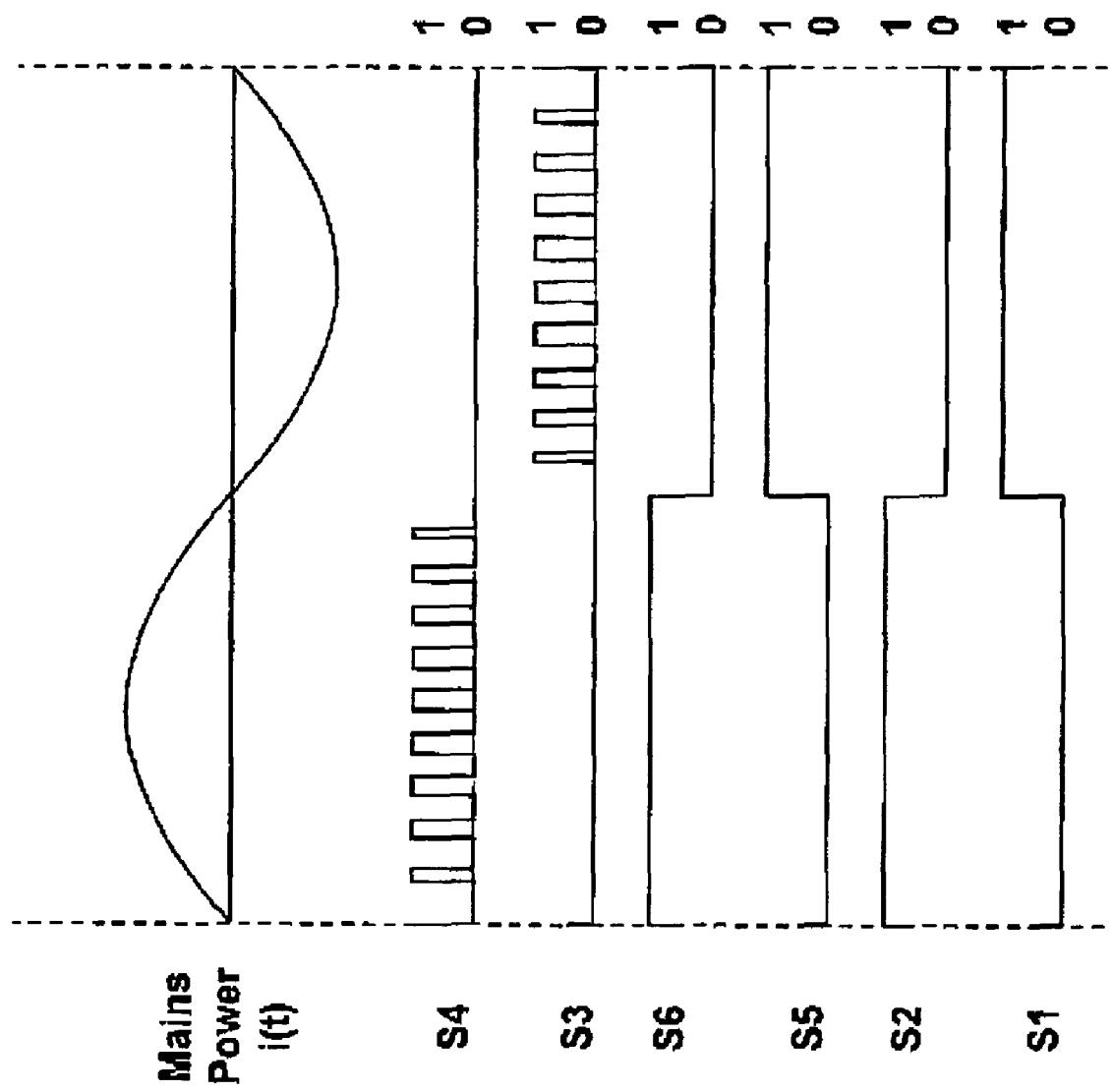

INVERTER FOR FEEDING ELECTRIC ENERGY INTO A POWER SUPPLY SYSTEM

The invention relates to an inverter of the type mentioned in the preamble of claim 1.

Various types of inverters are used to feed electric energy generated with direct voltage generators such as photovoltaic or fuel cell plants into an AC power power supply system, in particular into the utility power supply system (50/60 Hz). Between the direct voltage generator and the actual inverter (DC/AC converter), there is provided in most cases a DC converter (DC-DC chopper), which serves the purpose of converting the direct voltage supplied by the direct voltage generator into a direct voltage needed by the inverter or adapted thereto.

For different reasons it is desirable to ground one of the outputs of the direct voltage generator and, within the frame of the present invention, such cases are particularly taken into consideration in which the ground connection is provided at the negative output of the direct voltage generator. The reason for the desired grounding is, on the one side, that such grounding is prescribed in some countries. On the other side, various disadvantages arise during operation when such grounding is missing. One problem among others is the high-frequency leakage currents. Due to unavoidable parasitic capacities between the direct voltage generator and the ground, considerable equalizing currents, which present an intolerable safety risk, may happen in the event of potential fluctuations, which make it necessary to provide for complex monitoring measures with the help of residual current sensors or the like for contact protection or for electromagnetic compatibility (EMC) and which can only be securely avoided through grounding. Potential fluctuations on the direct voltage generator may further lead to permanent destructions of certain solar modules such as thin film modules or the like.

Grounding as described is readily possible if DC converters with transformers are used, which cause galvanic separation between the direct voltage side and the alternating voltage side to happen. Irrespective of whether power supply system transformers or high-frequency transformers are being used, transformers however result, inter alia, in a reduction of efficiency, in parts considerable weights and sizes and/or in additional regulation expense, this being the reason why transformerless voltage converters are basically preferred. The usual topologies of transformerless DC converters however either make it impossible to achieve the desired grounding since this would lead to a short circuit in needed switches, capacities or the like, or in increased circuitry expense and other disadvantages.

Numerous attempts have been made to otherwise avoid the disadvantages mentioned. Circuits have in particular been known, which serve the purpose of reducing the undesired leakage currents (e.g. 1DE 10 2004 037 466 A1, DE 102 21 592 A1, DE 10 2004 030 912 B3). In these circuits, a solar generator e.g., is operated isolated from the power supply system in certain phases of internal electric energy transport. When the solar generator is then periodically electrically connected to the power supply system, its parasitic capacities are only slightly reloaded so that the potential of the solar generator at mains frequency changes sinusoidally and at a voltage amplitude that corresponds to half the power supply system voltage. Due to the small voltage differences of the solar generator, high-frequency currents then only form between two switching cycles and through asymmetries during switching. In this way, capacitive leakage currents can be strongly minimized but cannot be completely avoided in principle.

There is further known a switching arrangement (DE 102 25 020 A1) using a divided solar generator the center point of which is grounded. As a result, all the parts of the solar generator have a fix potential and capacitive leakage currents cannot flow in principle. Since the two direct current sources have different yields, a circuit is moreover provided to accommodate the power differences and the voltages. In this circuitry proposition, the disadvantages are the high voltage differences in the solar generator and at the switches, the additional loss in the compensation circuit and the fact that at least four switches, which are clocked at high frequency, are needed.

Besides, circuit arrangements have already been known by means of which a solar generator can be grounded on one side even if a transformer is missing. As a matter of principle, capacitive leakage currents are thus avoided. One of these circuit arrangements (DE 196 42 522 C1) however needs five active switches, one or two switches switching simultaneously at high frequency and having to provide the mean output current. On this circuit, which is also referred to as a "flying inductor", the efficiency is affected by the great number of component parts participating simultaneously in series in the current flow. The disadvantage of this circuit also is that discontinuous current pulses are impressed upon the power supply system, which require a capacitive mains filter which, as a matter of principle, degrades the power factor but also the efficiency of the circuit in part load range, due to its own need for idle power. Although such a capacitive mains filter can be avoided using another known circuit (DE 197 32 218 C1), nine active switches are needed therefor, two of which at least must be switched simultaneously at high frequencies so that the construction expense would be even further increased and both the robustness and the efficiency of the entire device negatively affected. The topology of a flying inductor further has the disadvantage that the voltage load of the switches depends on the supply voltage and is sensitive to failures in the power supply system.

Finally, apparatus are known (US 2007/0047277 A1) which are configured to be two-stage and which comprise not only the actual inverter (DC/AC converter) but also a direct voltage or DC/DC converter. The inverters are provided with a bipolar voltage intermediate circuit containing two capacitors mounted in series and connected together at a ground terminal that is associated with the zero or neutral conductor of the respective power supply system and is connected thereto. In this case, the ground terminal of the inverter can also be connected to the negative output of the direct voltage generator. This is made possible using a storage reactor composed of two magnetically coupled windings. The two windings of this storage reactor are galvanically connected together at one end in such a manner that on the one side, when the switch is closed, one of the two windings is loaded by the direct voltage generator and the other winding via the first winding by virtue of the magnetic coupling and that on the other side, when the switch is open, the two windings are unloaded through a respective one of the two capacitors, which is associated, and through an associated diode.

The advantage that this device makes it possible to ground the direct voltage generator with relatively simple means, in particular without transformer, is offset by the disadvantage that it needs at least three active switches synchronized at high frequency and that it is of a two-stage configuration, which increases the control expense. Moreover, at least two switches in all must respectively be switched simultaneously at high frequency, this inevitably generating losses and affecting the efficiency.

In view of this prior art, the technical problem of the invention is to configure the inverter of the type mentioned herein above in such a manner that grounding of the negative terminal of the direct voltage generator may not only be realized with relatively simple means in terms of construction but also with a lesser number of switches operating at high frequency and being active simultaneously.

The solution to this problem is achieved, in accordance with the invention, with the characterizing features of claim 1.

The invention proposes an inverter of a one-stage construction type, i.e., an inverter wherein the DC-DC part and the DC-AC part are combined into one combined circuit arrangement. As a result, a common control is made possible in one single stage. Moreover, an inverter is provided wherein only one high-frequency switch is active at a time. Finally, the negative pole of the direct voltage generator can be grounded and the energy can be fed into the power supply system with a continuous current.

Other advantageous features of the invention will become apparent from the dependent claims.

The invention will be best understood from the following description of an exemplary embodiment when read in conjunction with the accompanying drawings. In said drawings:

FIG. 4 shows the signals used for controlling the switches of the inverter shown in the FIGS. 1 through 3.

Figure 1:
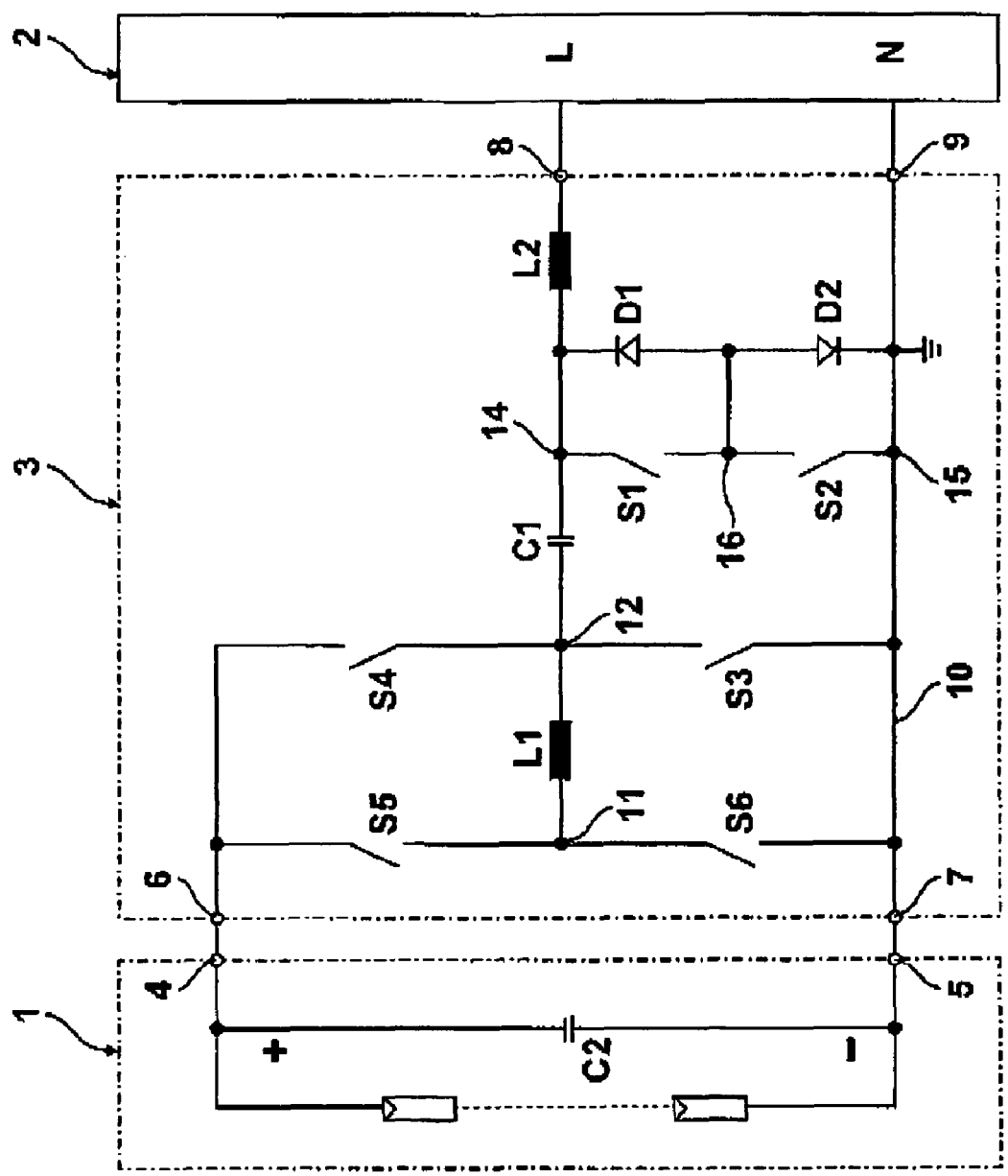
FIG. 1 shows the circuit diagram of an inverter of the invention.

According to FIG. 1, a device considered within the frame of the present invention includes a direct voltage generator 1, a power supply system 2 and an inverter 3 connected between the direct voltage generator 1 and the power supply system 2. The direct voltage generator 1 consists e.g., of a photovoltaic or a fuel cell plant and comprises a capacitor C2 connected in parallel with its two outputs 4(+) and 5(−) (e.g., US 2007/004277 A1).

The inverter 3 includes two inputs 6, 7 to be connected to the outputs 4, 5 of the direct voltage generator 1 and two outputs 8 and 9 that serve for connection to the power supply system 2 and for one-phase feeding of electric energy into the power supply system 2. A smoothing or mains reactor L2 is mounted upstream of at least one of the outputs 8, 9, which applies for the output 8 in the exemplary embodiment, said output being connected to phase L of the power supply system 2. Moreover, FIG. 1 shows that a line 10, which connects the output 9 to the input 7 to be connected to the negative output 5 of the direct voltage generator 1, is connected to ground potential.

As contrasted with most of the known circuit arrangements, no two-stage arrangement including a direct voltage (DC/DC) converter and a separate inverter (DC/AC converter) mounted downstream thereof is provided between the direct voltage generator 1 and the power supply system 2. Instead, the invention proposes an inverter 3 which has on the one side, in accordance with FIG. 1, boosting and bucking properties and which, on the other side, performs DC/AC conversion, thus combining the two functions, which are otherwise separate. For this purpose, a first series circuit consisting of two switches S3 and S4 and a second series circuit, which also consists of two switches S5 and S6, are connected in parallel with the two inputs 6, 7 in accordance with FIG. 1. A connection point 11 of the switches S5 and S6 is connected to a connection point 12 of the two switches S3, S4 through a storage reactor L1. The switches S3 through S6 and the storage reactor L1 form a bridge circuit with two current paths S6, L1, S4 as well as S5, L1 and S3 which will be discussed herein after, one of them serving for providing a positive output current and the other one for providing a negative output current.

A switch unit serves to choose which one of the two current circuits is active. Said unit includes on the one side the two switches S5 and S6, on the other side a series circuit formed from two switches S1, S2. In the exemplary embodiment, a terminal of the switch S1 is connected at a connection point 14 to a terminal of a coupling capacitor C1 acting as an energy accumulator, the other terminal of said capacitor being connected to the connection point 12. Moreover, one terminal of the switch S2 is connected to the line 10 at a connection point 15. The terminal 14 is further connected to the output 8 of the inverter 3 via the mains reactor L2. Finally, the switch unit comprises two freewheel diodes D1 and D2. The freewheel diode D1 is connected in parallel with the switch S1. Its cathode is connected to the terminal 14, its anode to a connection point 16 between the two switches S1, S2. The freewheel diode D2 is connected in parallel with the switch S2, its anode being connected to connection point 16 and its cathode with connection point 15.

In accordance with the invention, the switch unit is operated at the frequency of the power supply system 2 to be fed, i.e., e.g., at 50 Hz or 60 Hz. This operation occurs more specifically such that during the positive half waves of the supply voltage the switches S2 and S6 are in the closed condition, the switches S1, S3 and S5 by contrast in the open condition so that a positive output current is generated at the outputs 8, 9. As contrasted therewith, the switches S1 and S5 are in the closed condition and the switches S2, S4 and S6 in the open condition during the negative half waves of the supply voltage.

Whilst the switches S1, S2, S5 and S6 of the switch unit are only switched once for each period of the supply voltage, the remaining switches S3 and S4 serve for modulation of the sinusoidal currents to be fed during the positive or the negative half waves by being switched by a usual PWM control e.g., at high frequency, i.e., at a frequency of e.g., 16 kHz.

The described inverter 3 operates substantially as follows:

Unlike the buck-boost choppers, the energy in the inverter 3 is transported substantially capacitively through the coupling capacitor C1. The voltage at the coupling capacitor C1 can be assumed to be constant, when considered over short periods of time.

Herein after, the way of operation will at first be described, which is achieved at positive supply voltage and positive output current. The switches S1 through S6 here have the positions shown in FIG. 2, according to which the switches S1, S3 and S5 are open, the switches S2 and S6 adopt their closed condition and the switch S4 is switched at high frequency. As a result, the voltage UC1 at the coupling capacitor C1 is in average equal to the supply voltage UN, i.e., UC1=UN.

If the switch S4 is in the closed condition, a current path of the bridge circuit formed of the switches S4 and S6 as well as of the storage reactor L1 is active so that the storage reactor L1 is loaded by the direct voltage generator 1 or by its capacitor C2. It is thereby assumed that the coupling capacitor C1 is in the loaded condition, the connection point 12 (left side of the coupling capacitor C1 in FIG. 2) being at negative potential, the connection point 14 (right side of the coupling capacitor C1 in FIG. 2) by contrast at positive potential. Accordingly, a voltage UD1=UC2+UC1 in the reverse direction is applied to the freewheel diode D1, UC2 being substantially equal to the output voltage of the direct voltage generator 1.

The freewheel diode D2 is short-circuited by S1. As a result, the coupling capacitor C1 is unloaded by a positive current i(t)>0 flowing from the connection point 14 through the line inductance L2, the output 8, the power supply system 2, the output 9, the line 10, the direct voltage generator 1, the switch S4 and the connection point 12 back to the coupling capacitor C1. The current i(t) flowing through L2 increases thereby, i.e., L2 is loaded.

If the switch S4 is by contrast in the open condition, the currents continue to flow through L1 and L2 in the same directions. As a result, L1, L2 are unloaded again, which is only possible via the freewheel diode D1 because of the open switch S4. Accordingly, the voltages at the inductances L1 and L2 will adapt for the freewheel diode D1 to reach the conductive condition. As a result, the current flows from L1 through S6, 10, 15, S2, 16, D1, 14 and C1 back to connection point 12 so that the coupling capacitor C1 is loaded. As contrasted therewith, the current flows from L2 through the output 8, the power supply system 2, the output 9, the connection point 15, the switch S2, the connection point 16 and the freewheel diode D1 back to connection point 14. As a result, the currents through L1 and L2 decrease progressively.

If the duty factor between the duty cycle and a pulse elementary period for the switch S4 is indicated at D, both the voltage transfer ratio and the current transfer ratio can be calculated from the balance of the voltage/time areas at the inductances L1 and L2. According thereto, $$UN/UC2 = D/(1-D)$$

and $$iL2/iL1 = (D-1)/D,$$

it being assumed that there are no losses. These equations show that the inverter 3 operates in the bucking mode when D<0.5 and in the boosting mode when D>0.5.

Figure 3:
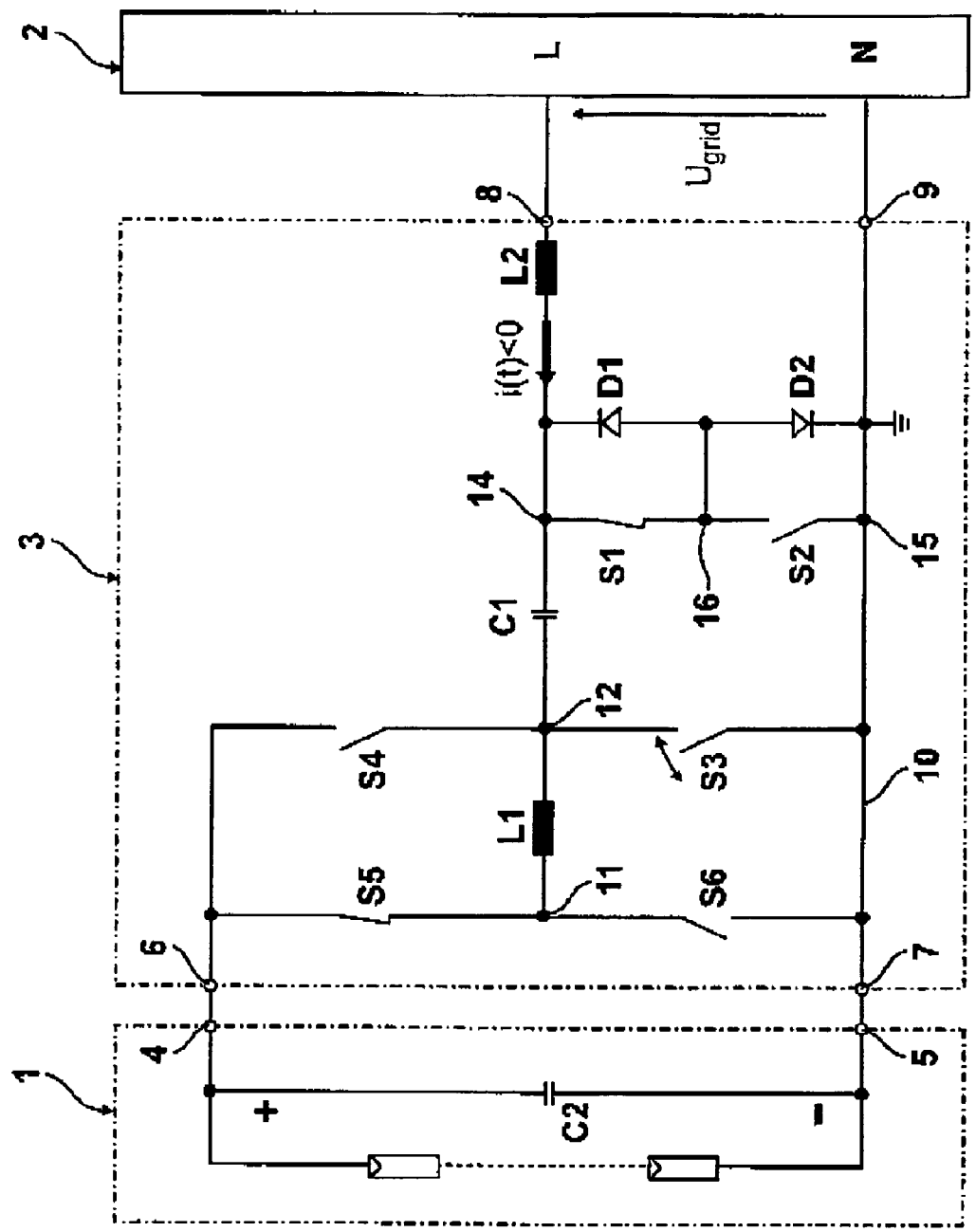
FIG. 3 shows the operation of the inverter shown in FIG. 1 at negative supply voltage and at negative output current.

At negative supply voltage and negative output current, the way of operation of the inverter 3 is fixed in that the switches S1 through S6 now adopt the positions shown in FIG. 3, according to which S2, S4 and S6 are open, the switches S1 and S5 adopt their closed condition and the switch S3 is connected at high frequency. Here the voltage UC1 at C1 equals in average the sum resulting from the output voltage UC2 of the direct voltage generator 1 and the supply voltage UN, i.e., that in the almost stationary condition UC1=UC2+UN.

If the switch S3 is in the closed condition, a current path of the bridge circuit is active that is formed of the switches S3 and S5 as well as of the storage reactor L1, said storage reactor L1 being loaded by the direct voltage generator 1 as a result thereof, however in a direction reverse to the one of the positive half wave. The coupling capacitor C1 is again already in the loaded condition, connection point 12 (left side of C1 in FIG. 3) being at positive potential and connection point 14 (right side of C1 in FIG. 3) at negative potential. Therefore, the voltage UC1 at the freewheel diode D2 lies in the reverse direction whilst the freewheel diode D1 is short-circuited by S1. As a result, the coupling capacitor C1 is unloaded by a current i(t)<0 flowing through the power supply system 2, i.e., a current flows from connection point 12 through switch S3, the line 10, the connection point 15, the output 9, the power supply system 2, the output 8, the mains reactor L2 and the connection point 14 back to the coupling capacitor C1. The current through L2 thereby increases, i.e., L2 is loaded.

If, by contrast, switch S3 is in the open condition, the currents continue to flow through L1 and L2 in the same directions. As a result, L1 and L2 are unloaded again, which, because of the open switch S3, is only possible by adapting accordingly the voltage to L1 and L2 and by forcing the current through the freewheel diode D2. Therefore, the current from L1 now flows starting from connection point 12 through C1, 14, S1, 16, D2, 15, 10, 1 (or C2) and S5 back to L1 so that coupling capacitor C1 is loaded. As contrasted therewith, the current from L2 flows from connection point 14 through S1, 16, D2, 15, 10, the output 9, the power supply system 2 and the output 8 back to L2. As a result, the currents through L1, L2 decrease progressively.

If the duty factor between the duty cycle and a pulse elementary period for the switch S3 is indicated at D, it can be noted, analogous to the above consideration applying for the positive half wave, that $$UN/UC2 = D/(1-D)$$

and that $$iL2/iL1 = (D-1)/D,$$

it being again assumed that there are no losses. Like with the positive half wave, both boost and buck modes of operation are possible.

Since both the output voltage and the output current are sinusoidal because of the line inductance L2 used, the duty factor D for each half wave is modulated or controlled in a way known per se. This is schematically shown in FIG. 4, the values "0" and "1" indicate the respective off and on conditions of the switches S1 through S6. Analogous to the shape of the curve of i(t), the mains voltage that has not been illustrated herein is to be ideally assumed to be sinusoidal. The switches S3 and S4 are controlled by pulses that are becoming wider and narrower as this is the case with PWM controllers. The timing of the switches S3, S4 alternately occurs for the two half waves at duty factor D(t), wherein $$D(t) = M/(M+1)$$

and wherein $$M = UN/UC2 = D/(1-D)$$

describes the ratio between the output voltage at the outputs 8, 9 and the input voltage at the inputs 6, 7 of the inverter 3. The switches S2, S6 are switched complementary to the switches S1, S5.

Figure 2:
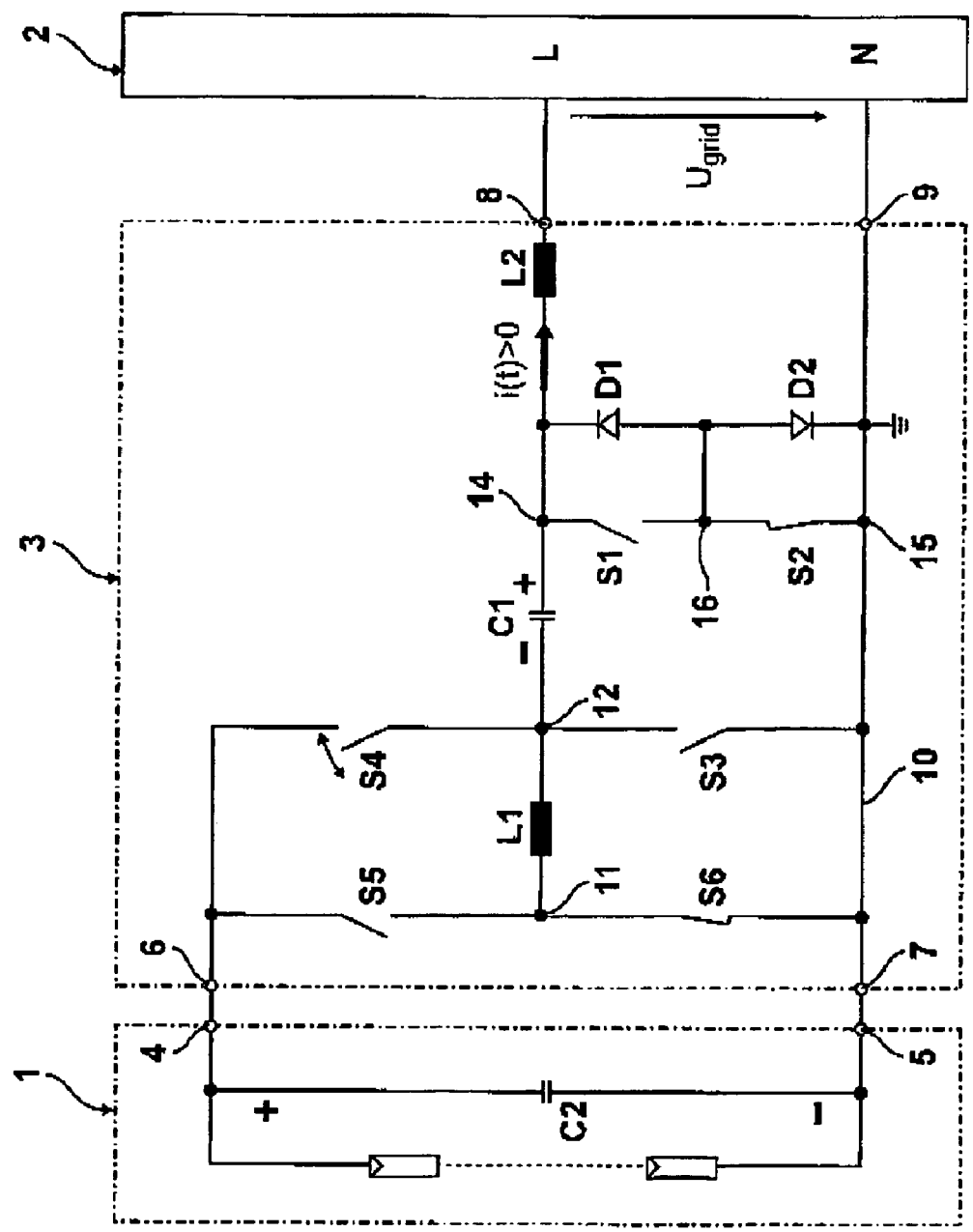
FIG. 2 shows the operation of the inverter shown in FIG. 1 at a positive supply voltage and at a positive output current.

The circuit arrangement described for the inverter 3 can be traced back to two simple basic forms. During the positive half wave (positive output current), the inverter 3 operates in the way of what is referred to as a Zeta converter comprising the components S4, L1, C1, D1 and L2 and leaves the polarity of the input voltage unchanged (FIG. 2). By contrast, the inverter 3 operates during the negative half waves (negative output current) as what is referred to as a Cuk converter comprising the components S3, L1, C1, D2 and L2 and inverting the polarity of the input voltage (FIG. 3). For this purpose, the switches S1 through S6 are assumed to be ideal, i.e., forward resistances or the like do not occur. Both types of converters Zeta and Cuk moreover have in common the property of a mainly capacitive energy transfer.

A particular advantage is obtained in that the inverter 3 of the invention combines in one and the same circuit arrangement a Zeta converter and a Cuk converter as well as a switch unit formed from the switches S1, S2, S5 and S6. This switch unit alternately switches at mains frequency to the Zeta or the Cuk function and sets by means of the switches S5 and S6 the current direction through L1 on the one side and by means of the switches 51 and S2 the function of the freewheel diodes D1 and D2 on the other side. Another advantage is that during the positive and negative half waves only one single switch S3 or S4 needs to be actuated at high frequency so that the loss can be kept low and that high efficiency is achieved. Finally, it is advantageous that a one-stage arrangement occurs that results in simplified control expense. In this context, the switch unit cannot be considered as the second stage since it only has a switch function and does not serve for modulation of the positive and negative output currents. In practice, the switches S1, S2, S5 and S6 are switched with chronological synchronism with the zero crossings of the mains currents for which no complex control unit but only an apparatus for measuring the zero crossings is needed. Irrespective thereof, the bridge circuit formed from the switches S3 through S6 and from the storage reactor L1 can be designed as a specially operated H bridge, the storage reactor L1 lying in the bridge branch and forming either with the switches S4 and S6 or with the switches S3 and S5 side branches of the bridge or current paths in which the current flows in opposite directions through the storage reactor L1. Hence, the inverter 3 can be generally considered as a circuit arrangement including an H bridge, a switch unit and an energy accumulator in the form of a coupling capacitor C1. At the same time, this circuit arrangement makes it possible to ground the negative output 5 of the direct voltage generator 1 or the input 7 of the inverter 3 intended for connection to this output 5 and to effect a continuous current flow to the power supply system 2. For the rest, it is clear that besides a positive or negative voltage, a vanishingly small output voltage can be provided at need at the outputs 8 and 9 of the inverter 3, i.e., the output voltage can be zero, greater than zero or smaller than zero.

The invention is not limited to the exemplary embodiment described, which can be varied in various ways. More specifically, only those components have been described in the description given herein above that were needed to better understand the invention, i.e., per se known required controllers, MPP controllers or the like are additionally provided, according to need. Also, it is understood that the various features can be used in other combinations than those described and illustrated.

The invention claimed is:

1. An inverter for feeding electric energy into a power supply system with respective inputs intended for connection to the negative and positive output of a direct voltage generator, said input intended for connection to the negative output being adapted for grounding, with two outputs intended for connection to said power supply system, at least one output being provided with a mains reactor and with a device for converting a direct voltage at the inputs into an alternating voltage at the outputs, said device comprising a storage reactor and switches, said device including a bridge circuit with two current paths, of which the one is designed for providing positive output currents and the other one for providing negative output currents, a switch unit for switching at mains frequency between the two current paths and a coupling capacitor connecting said bridge circuit to said switch unit, wherein said bridge circuit is configured to be an H-bridge, the two current paths each comprising two switches and the storage reactor being common to both circuit paths, a first series circuit comprising first and second switches and a second series circuit also comprising first and second switches being connected in parallel, as well as that a connection point between the two switches of the second series circuit is connected to a connection point between the two switches of the first series circuit through the storage reactor and that the switches of the first and the second series circuit and the storage reactor form the bridge circuit with the current paths through the second switch of the second series circuit, the storage reactor and the second switch of the first series circuit, the storage reactor and the second switch of the first series circuit, as well as through the first switch of the second series circuit, the storage reactor and the first switch of the first series circuit.

2. The inverter as set forth in claim 1, wherein the switch unit comprises two additional switches mounted in series between the outputs and freewheel diodes connected in parallel therewith.

3. The inverter as set forth in claim 2, wherein one end of the coupling capacitor is connected to a terminal of the storage reactor and that the other end of the coupling capacitor is connected to one of the outputs.

4. The inverter as set forth in claim 2, wherein one of the two other switches of the switch unit is in the closed condition during positive half waves only and that the other one of the two additional switches of the switch unit is in the closed condition during the negative half waves of the supply voltage only.

5. The inverter as set forth in claim 1, wherein one switch of either of the two current paths of the bridge circuit is a switch actuated at high frequency.

6. An inverter configured to feed electric energy from a direct voltage generator at an input thereof into a power supply system at an output thereof, comprising:
an H-bridge circuit comprising a first selective conduction path including a first inductance, and a second, different selective conduction path including the first inductance;
a switching circuit configured to facilitate current conduction from the first selective conduction path through a second inductance associated with the output in a first direction in a first switch configuration, and facilitate current conduction from the second selective conduction path through the second inductance in a second, different direction in a second, different switch configuration; and
an energy accumulator coupled between the H-bridge circuit and the switching circuit, wherein the energy accumulator comprises a capacitance, thereby providing a capacitive coupling between the H-bridge circuit and the switching circuit.

7. The Inverter of claim 6, wherein a terminal of the energy accumulator is connected to the first inductance of the H-bridge circuit.

8. The inverter of claim 6, wherein the first selective conduction path is active when the second, different selective path is inactive, and vice-versa.

9. The inverter of claim 8, wherein the switching circuit is configured to conduct current through the second inductance in the first direction in the first switch configuration when the first selective conduction path is active.

10. The inverter of claim 9, wherein the switching circuit in the first switch configuration comprises a diode having a cathode coupled to the energy accumulator and an anode coupled to a center node, and a switch coupled between the center node and circuit ground.

11. The inverter of claim 8, wherein the switching circuit is configured to conduct current through the second inductance in the second direction in the second switch configuration when the second selective conduction path is active.

12. The inverter of claim 11, wherein the switching circuit in the second switch configuration comprises a switch coupled between the energy accumulator and a center node, and a diode having an anode coupled to the center node and a cathode coupled to circuit ground.

13. The inverter of claim 6, wherein the first selective conduction path comprises a first switch and a second switch connected in series through the first inductance, wherein when the second switch is closed, the first switch switches open and closed at a frequency that is greater than a frequency of the power supply system.

14. The inverter of claim 13, wherein the first switch of the first selective conduction path is coupled between a positive potential input of the inverter and the first inductance, and wherein the second switch of the first selective conduction path is coupled between the first inductance and a circuit ground potential.

15. The inverter of claim 6, wherein the second selective conduction path comprises a first switch and a second switch connected in series through the first inductance, wherein when the first switch is closed, the second switch switches open and closed at a frequency that is greater than a frequency of the power supply system.

16. The inverter of claim 15, wherein the first switch of the second selective conduction path is coupled between a positive potential input of the inverter and the first inductance, and wherein the second switch of the second selective conduction path is coupled between the first inductance and a circuit ground potential.

17. The inverter of claim 6, wherein the switching circuit comprises: a pair of switches connected together in series at a center node; and a pair of diodes connected together in series at the center node, wherein the pair of switches and the pair of diodes are connected together in parallel.

18. The inverter of claim 17, wherein the pair of switches operate in such a manner that one of the switches is open and the other is closed in the first switch configuration and vice-versa in the second switch configuration.

19. The inverter of claim 17, wherein each of the diodes in the pair of diodes includes an anode connected to the center node.

20. The inverter of claim 6, wherein the switching circuit is configured to switch between current conduction through the second inductance in the first and second directions at a frequency that corresponds to a frequency of the power supply system.

* * * * *